United States Patent [19]

Mizokami

[11] Patent Number: 4,518,237
[45] Date of Patent: May 21, 1985

[54] INDICATOR FOR PROPER OR IMPROPER EXPOSURE BY AUTOMATIC ELECTRONIC FLASH

[75] Inventor: Kazunori Mizokami, Hachioji, Japan

[73] Assignee: Olympus Optical Company Ltd., Tokyo, Japan

[21] Appl. No.: 446,563

[22] Filed: Dec. 3, 1982

[30] Foreign Application Priority Data

Apr. 30, 1982 [JP] Japan ................................. 57-72948

[51] Int. Cl.³ ............................................. G03B 15/02
[52] U.S. Cl. .............................. 354/127.1; 354/289.1; 315/133; 315/151
[58] Field of Search ..................... 354/32, 60 E, 60 F, 354/60 L, 127, 128, 289, 465, 127.1, 127.13, 289.1; 315/133–136, 151

[56] References Cited

U.S. PATENT DOCUMENTS 4,122,465 10/1978 Hasegawa et al. .............. 354/128 X
4,193,677 3/1980 Hasegawa et al. .............. 354/127.13

FOREIGN PATENT DOCUMENTS 156620 12/1977 Japan .
19075 5/1981 Japan .
57-2977 1/1982 Japan .
2108690 5/1983 United Kingdom ................ 354/465

*Primary Examiner*—L. T. Hix
*Assistant Examiner*—Della J. Rutledge
*Attorney, Agent, or Firm*—Louis Weinstein

[57] ABSTRACT

An indicator for proper or improper exposure provided by automatic electronic flash includes a first decision circuit having a first decision level lower than a proper level of exposure, and a second decision circuit having a second decision level higher than the proper level of exposure. Thus, a given film latitude is allowed for the overexposure and the underexposure in determining and displaying the overexposure, the underexposure or proper exposure.

13 Claims, 8 Drawing Figures

INDICATOR FOR PROPER OR IMPROPER EXPOSURE BY AUTOMATIC ELECTRONIC FLASH

BACKGROUND OF THE INVENTION

The invention relates to an indicator for proper or improper exposure by an automatic electronic flash, and more particularly, to such indicator which indicates the result of an actual exposure provided by an automatic electronic flash, giving an indication of an overexposure, underexposure or proper exposure.

As is well recognized, when taking a picture with the aid of an automatic electronic flash, the amount of light emission from the electronic flash can be controlled within a limited range. The control of the electronic flash tends to result in an overexposure as a distance to an object being photographed decreases or as a diaphragm aperture increases toward an open value. For example, in an automatic electronic flash of series controlled type, if an emission terminate signal is applied in synchronism with a flash emit signal, there results a finite or minimum emission of light from the electronic flash rather than resulting in zero emission. This is attributable to the nature of a forced commutation circuit including a thyristor of an automatic emission control circuit contained in the electronic flash. If the emission terminate signal causes the thyristor to conduct, it takes a given magnitude of turn-on time which is inherent to the thyristor. Recently, TTL automatic electronic flash is in practical use which is controlled in accordance with an output from an automatic exposure control circuit of a camera of TTL (through-the-lens) direct photometry type. This permits the implementation of a variety of lighting set-ups or the use of multiple electronic flashes in an automatic emission control mode, by interconnecting the camera and the electronic flash or flashes by means of electric cords. However, a transmission lag due to transmission lines running between the camera and the emission control circuit of the electronic flashes or the multiple lighting causes an increase in the minimum emission. For the sake of reference, representing the minimum emission of each individual electronic flash by $G_{NO}L$, the minimum emission where N electronic flashes are used to provide a multiple lighting will be equal to $G_{NO}L \times \sqrt{N}$. When the minimum emission increases in this manner, an amount of exposure Ev given by actual light emission from electronic flash or flashes will be as indicated by a curve L in FIG. 1. Thus, the amount of exposure will deviate from a proper exposure level $L_0$ toward the overexposure as the distance to an object being photographed decreases. The overexposure renders it impossible to take a picture with the aid of an electronic flash in a range of distance to an object being photographed which is located nearer than a point P toward the photographer. On the other hand, the maximum emission of the electronic flash will be exceeded with a distance to an object being photographed which is located further beyond a point D, resulting in an underexposure.

A variety of indicators for providing an indication of proper or improper exposure given by an automatic electronic flash are known, including 1. an apparatus for providing an indication of proper or improper exposure based upon the comparison against a first level corresponding to proper exposure and a second level which represents a given amount of overexposure, of an output from an integrator which integrates the amount of light incident (see Japanese Utility Model Publication No. 2,977/1982);

2. an apparatus for providing an indication of proper or improper exposure based upon a determination if an output from the integrator has reached a proper level at time which occurs a given time interval after the initiation of the emission of flashlight (see Japanese Laid-Open Patent Application No. 156,620/1977);

3. an apparatus including means to give a warning of underexposure at a given time interval after the initiation of emission of the flashlight (or closure of X-contacts), and in which the warning means is disabled if the electronic flash has ceased to emit flashlight at a proper exposure level (see Japanese Utility Model Publication No. 19,075/1981).

With the apparatus mentioned above sub-paragraph 1 above, the amount of incident light supplied from the electronic flash is monitored to determine and to indicate if an overexposure level, which is a given value above a proper exposure level, is reached. With this apparatus, while a given latitude from the proper level is considered for the overexposure, no latitude is considered in the determination of the underexposure. Consequently, if the integral of an amount of light incident when the electronic flash is allowed to provide a full emission is less than the proper level by an amount which is as little as 0.1 Ev, the apparatus provides an indication of underexposure. Accordingly, there results an unbalanced criterion of the overexposure and the underexposure. In practice, it will be desirable that a given latitude should be allowed for the underexposure in the same manner as such latitude is allowed for the overexposure. For practical purposes, a satisfactory photographing operation is achieved with a latitude on the order of $-\frac{1}{2}$ Ev to $-\frac{1}{3}$ Ev. It should also be noted that the integration of an amount of incident light during a photographing operation with the aid of an electronic flash is normally initiated in synchronism with the initiation of light emission from the electronic flash, and thus a component of an integral which is attributable to steady-state light, though of relatively low brightness, which exists until the first blind of the shutter becomes fully open, is discarded from the determination. To take this into consideration, it is reasonable to allow a given latitude for the underexposure.

SUMMARY OF THE INVENTION

In view of the foregoing, it is an object of the invention to provide an indicator for proper or improper exposure provided by automatic electronic flash in which an integral of an amount of incident light is compared against a pair of decision levels which correspond to a given latitude on the overexposure and the underexposure side and in which an exposure level located between these decision levels is determined to be proper while an exposure level outside the range defined by the decision levels is determined to be either an overexposure or an underexposure.

This improves the indication of the underexposure, as compared with the prior art practice.

DESCRIPTION OF PREFERRED EMBODIMENT

Figure 2:
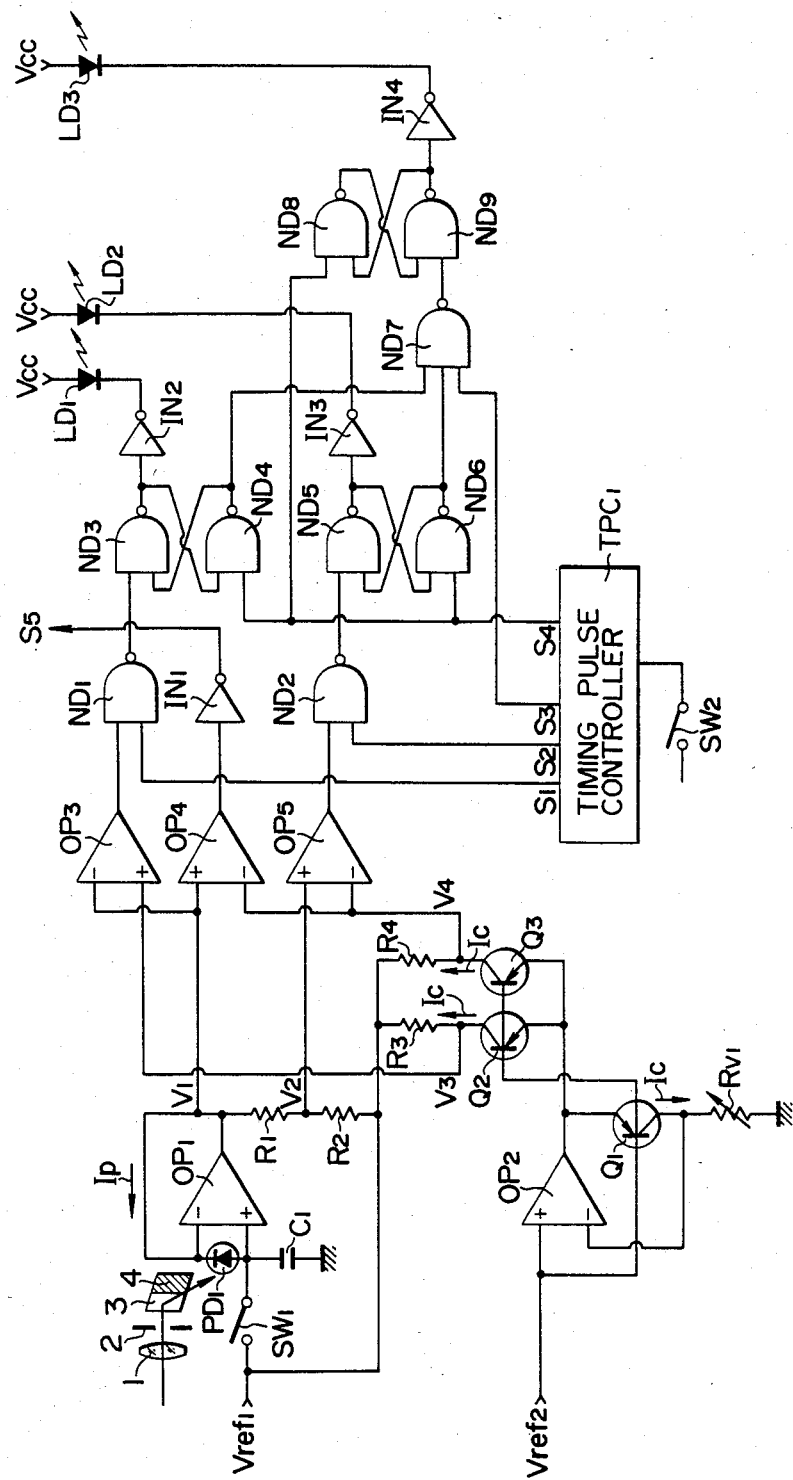
FIG. 2 is a circuit diagram of an indicator for proper or improper exposure provided by an automatic electronic flash, which is constructed in accordance with one embodiment of the invention.

Referring to FIG. 2, there is shown an electrical circuit of an indicator for proper or improper exposure provided by an automatic electronic flash which is constructed in accordance with one embodiment of the invention. The indicator is adapted to be incorporated into a camera of TTL direct photometry type and having a photoelectric transducer element $PD_1$ which is used for purpose of photometry. Light from an object being photographed passes through a taking lens 1 and a diaphragm 2 of the camera to be reflected by a film surface 3 and the surface 4 of a shutter blind. The transducer element is disposed toward the bottom of the camera and is directed upward to receive light reflected by the film surface 3 and the blind surface 4. The transducer element $PD_1$ has its anode and cathode respectively connected to the non-inverting and the inverting input terminal of an operational amplifier $OP_1$, with the anode being connected to the ground through an integrating capacitor $C_1$. The junction between the transducer element $PD_1$ and capacitor $C_1$ is connected through a trigger switch $SW_1$ to receive a reference voltage Vref1. The switch $SW_1$ is opened in ganged relationship with the initiation of running of the first blind of the shutter. The switch $SW_1$ is closed in ganged relationship with the termination of a winding operation of the first blind. The output of the amplifier $OP_1$ is connected to the inverting input terminal thereof, and is also connected through a series combination of voltage divider resistors $R_1$, $R_2$ to a source of reference voltage (not shown) which develops reference voltage Vref1. The output of the amplifier $OP_1$ is also connected to the inverting input terminal of a comparator $OP_3$ which operates to determine an underexposure, and to the non-inverting input terminal of a comparator $OP_4$ which operates to determine an emission termination level. The junction between the resistors $R_1$, $R_2$ is connected to the non-inverting input terminal of a comparator $OP_5$ which operates to determine an overexposure.

There is provided another source of reference voltage (not shown) which produces a reference voltage Vref2 higher than the first mentioned reference voltage Vref1, and the reference voltage Vref2 is applied to the non-inverting input terminal of an operational amplifier $OP_2$ and to the base of each of PNP transistors $Q_1$, $Q_2$ and $Q_3$. The inverting input terminal of the amplifier $OP_2$ is connected to the collector of the transistor $Q_1$, and its output terminal is connected to the emitter of each transistor $Q_1$, $Q_2$, $Q_3$. The collector of the transistor $Q_1$ is also connected to one end of a variable resistor $Rv_1$ which is used to preset film speed information, the other end of the resistor $Rv_1$ being connected to the ground. The collector of the transistor $Q_2$ is connected through a resistor $R_3$ to the source of reference voltage Vref1, and is also connected to the non-inverting input terminal of the amplifier $OP_3$. The collector of the transistor $Q_3$ is connected through a resistor $R_4$ to the source of reference voltage Vref1, and is also connected to the inverting input terminals of the comparators $OP_4$ and $OP_5$. It is to be noted that the resistors $R_3$ and $R_4$ are chosen such that the resistance of resistor $R_3$ is less than the resistance of resistor $R_4$ ($R_3 < R_4$).

Figure 4:
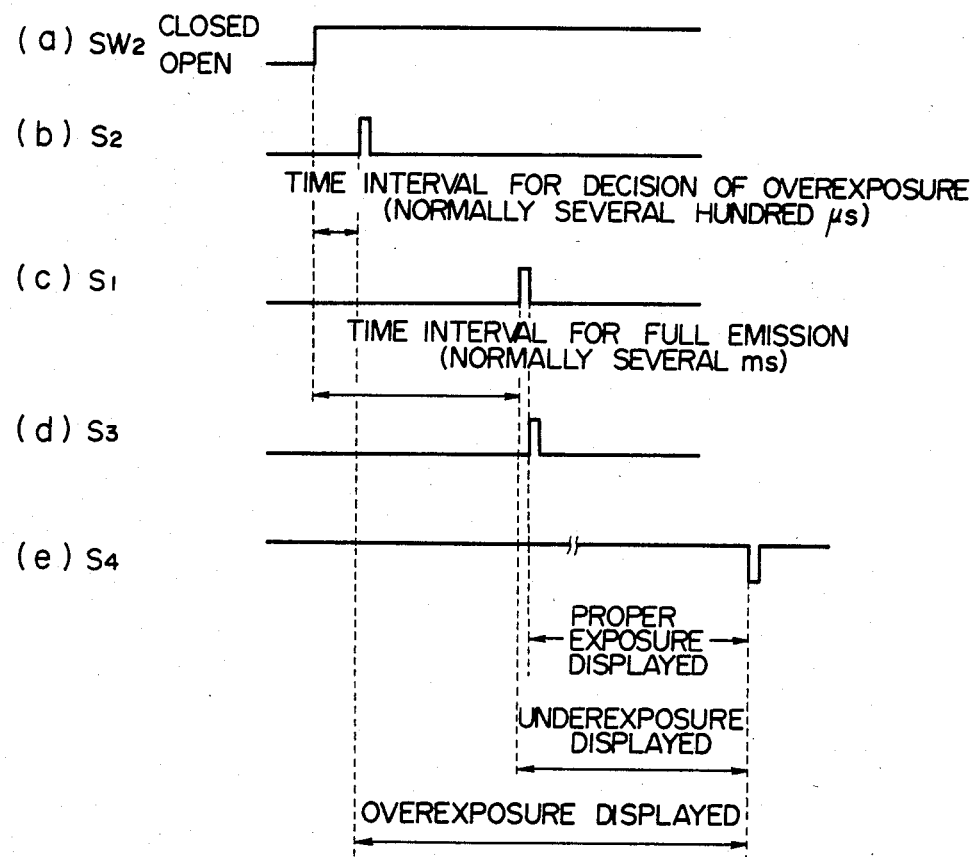
FIGS. 4(a) to 4(e) are a series of timing charts illustrating the waveform of various signals appearing in the indicator of FIG. 2.

The output of the comparator $OP_3$ is connected to one input of NAND circuit $ND_1$. The output of the comparator $OP_4$ is connected to the input of an inverter $IN_1$. The output of the comparator $OP_5$ is connected to one input of NAND circuit $ND_2$. The other input to NAND circuit $ND_1$ is fed from a first output terminal of a timing pulse controller $TPC_1$ so as to be supplied with an underexposure examine pulse signal $S_1$, as shown in FIG. 4(c). The other input of NAND circuit $ND_2$ is connected to a second output terminal of the timing pulse controller $TPC_1$, so as to be supplied with an overexposure examine pulse signal $S_2$, as indicated in FIG. 4(b). The underexposure examine pulse signal $S_1$ rises from its "L" level to its "H" level at a given time interval on the order of several milliseconds, which corresponds to a full emission of flashlight from the electronic flash, after the closure off X-contacts $SW_2$ which has its one end connected to timing pulse controller $TPC_1$ (see FIG. 4(a)). The signal $S_1$ temporarily remains at its "H" level. The overexposure examine pulse signal $S_2$ rises from "L" to its "H" level at an overexposure decision time, which is normally on the order of several hundreds of microseconds, after the closure of the X-contacts $SW_2$, and temporarily remains at its "H" level.

The output of NAND circuit $ND_1$ is connected to one input of NAND circuit $ND_3$, which forms an R-S flipflop together with NAND circuit $ND_4$. Specifically, the output of NAND circuit $ND_3$ is connected to one input of NAND circuit $ND_4$, the output of which is connected to the other input of NAND circuit $ND_3$. Said one input of NAND circuit $ND_3$ represents a set input while the other input of NAND circuit $ND_4$ represents a reset input to the flipflop. As shown, the other input of NAND circuit $ND_4$ which represents the reset input is connected to a fourth output terminal of the timing pulse controller $TPC_1$, which produces a reset pulse signal $S_4$ as shown in FIG. 4(e). The reset pulse signal $S_4$ changes from its "H" to its "L" level at a given delay interval after the closure of the X-contacts $SW_2$, and reverts to its "H" level after momentarily staying at its "L" level. The output of NAND circuit $ND_3$, which represents the $\overline{Q}$ output of the R-S flipflop, is connected to the input of an inverter $IN_2$, the output of which is connected to the cathode of light emitting diode $LD_1$ which has its anode connected to receive an operating voltage Vcc in order to indicate an underexposure. The output of NAND circuit $ND_4$, which represents the Q output of the R-S flipflop, is connected to a first input of a three input NAND circuit $ND_7$.

The output of the inverter $IN_1$ is connected to mating electrical contacts (not shown) of the camera and the automatic electronic flash for connection with an automatic emission control circuit (not shown) disposed within the electronic flash. An output from the inverter $IN_1$ which changes from its "H" to its "L" level is transmitted as an emission terminate signal $S_5$ to the electronic flash.

The output of NAND circuit $ND_2$ is connected to one input of NAND circuit $ND_5$, which forms an R-S flipflop together with NAND circuit $ND_6$ in the similar manner as the combination of NAND circuits $ND_3$ and $ND_4$. The other input of NAND circuit $ND_6$, which represents a reset input to the flipflop, is connected to the fourth output terminal of the timing pulse controller $TPC_1$ so as to be fed with the reset pulse signal $S_4$ therefrom. The output of NAND circuit $ND_5$, which represents the $\overline{Q}$ output of the R-S flipflop, is connected to the input of an inverter $IN_3$, the output of which is connected to the cathode of a light emitting diode $LD_2$ which has its anode connected to receive an operating voltage Vcc in order to display an overexposure. The output of NAND circuit $ND_6$, which represents the Q output of the R-S flipflop, is connected to a second input of the three input NAND circuit $ND_7$ A third input to the three input NAND circuit $ND_7$ is connected to a third output terminal of the timing pulse controller $TPC_1$ so as to be fed with a proper exposure display pulse signal $S_3$ which undergoes a temporary excursion from its "L" to its "H" level in synchronism with the reversion of the underexposure examine pulse $S_1$ to its "L" level. The output of NAND circuit $ND_7$ is connected to one input of NAND circuit $ND_9$, which forms an R-S flipflop together with NAND circuit $ND_8$, in the similar manner as the combination of NAND circuits $ND_3$ and $ND_4$. One input of NAND circuit $ND_8$, which represents a reset input to the R-S flipflop, is connected to the fourth output terminal of the timing pulse controller $TPC_1$ so as to be fed with the reset pulse signal $S_4$ therefrom. The output terminal of NAND circuit $ND_9$, which represents the $\overline{Q}$ output of the R-S flipflop, is connected to the input of an inverter $IN_4$, the output of which is connected to the cathode of a light emitting diode $LD_3$ which has its anode connected to receive an operating voltage Vcc in order to display a proper exposure.

Figure 1:
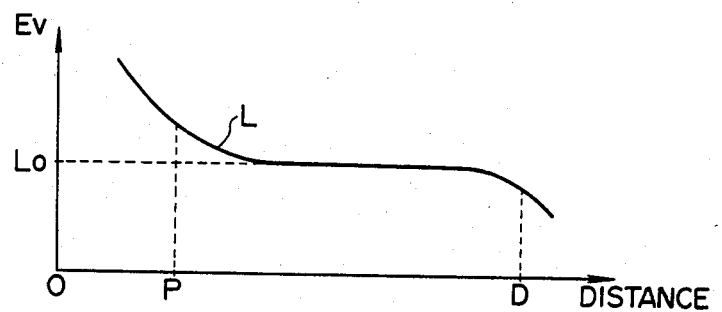
FIG. 1 graphically illustrates the amount of exposure plotted against a distance to an object being photographed with the aid of an electronic flash.
Figure 3:
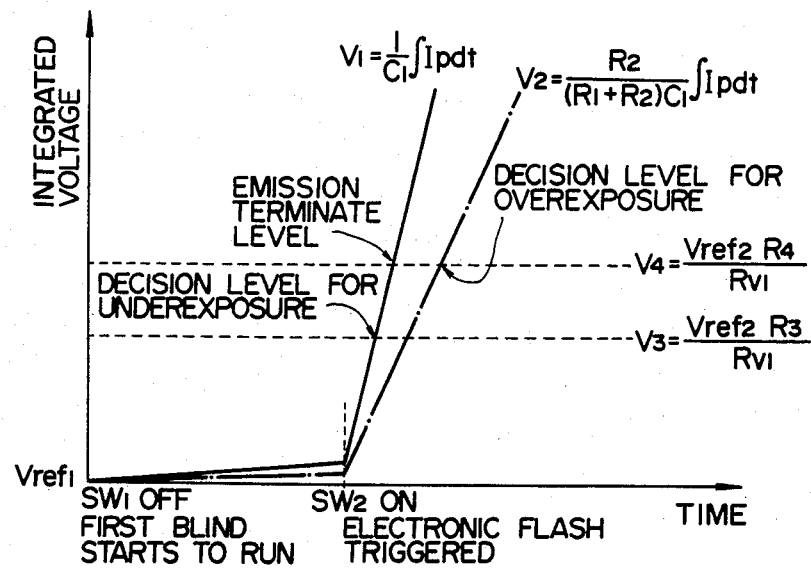
FIG. 3 graphically illustrates the operation of the indicator shown in FIG. 2, also illustrating the decision levels used to determine an overexposure and an underexposure.

In operation, upon depression of a shutter release button of the camera, a movable reflecting mirror is resiliently driven out of a taking light path, followed by the initiation of running of the first blind of the shutter. The trigger switch $SW_1$ is opened in interlocked relationship therewith (see FIG. 3). The incidence of light from an object being photographed which has passed through the taking lens 1 and the diaphragm 2 and reflected by the film surface 3 and the blind surface 4 onto the transducer element $PD_1$ causes the latter to produce a photocurrent Ip, which charges the integrating capacitor $C_1$. Accordingly, the voltage across the capacitor $C_1$ or a potential $V_1$ applied to the non-inverting input terminal of the amplifier $OP_1$ increases gradually as indicated in FIG. 3. Because the capacitor $C_1$ is previously charged to the reference voltage Vref1, the voltage $V_1$ can be expressed as follows:

$$V_1 = Vref1 + \frac{1}{C_1} \int I_p dt \qquad (1)$$

The output voltage $V_1$ of the amplifier $OP_1$ is equal to the input voltage $V_1$. The output voltage $V_1$ is applied to the inverting input terminal of the comparator $OP_3$ and to the non-inverting input terminal of the comparator $OP_4$. The output voltage $V_1$ is also divided by the voltage divider, whereby a voltage $V_2$ is developed at the junction between the resistors $R_1$, $R_2$ which is expressed as follows:

$$V_2 = Vref1 + \frac{R_2}{C_1(R_1 + R_2)} \int I_p dt \qquad (2)$$

The voltage $V_2$ is applied to the non-inverting input terminal of the comparator $OP_5$.

The transistor $Q_1$ has its base, emitter and collector connected to the non-inverting input terminal, the output terminal and the inverting input terminal, respectively, of the amplifier $OP_2$. The amplifier $OP_2$ operates to maintain the collector potential equal to the reference voltage Vref2 by a collector current, which is expressed as follows:

$$Ic = (Vref2/Rv1) \qquad (3)$$

The magnitude of the current Ic is determined in accordance with film speed which is established by an adjustment of the variable resistor Rv1. The same collector current Ic flows through the collector of each of the transistors $Q_2$ and $Q_3$ which have their emitters and bases connected in common with the transistor $Q_1$, and accordingly, collector voltages $V_3$ and $V_4$ are developed at the collector of the transistors $Q_2$ and $Q_3$ by the collector current Ic which flows through the resistors $R_3$ and $R_4$, respectively:

$$V_3 = Vref1 + R_3 Ic \qquad (4)$$
$$= Vref1 + \frac{R_3}{Rv1} Vref2$$
$$V_4 = Vref1 + R_4 Ic \qquad (5)$$
$$= Vref1 + \frac{R_4}{Rv1} Vref2$$

Since resistance of the resistor $R_3$ is less in magnitude than that of the resistor $R_4$, the voltages $V_3$ and $V_4$ are related such that $V_3 < V_4$, as indicated in FIG. 3. The voltage $V_3$ is applied to the non-inverting input terminal of the comparator $OP_3$ as a reference voltage which is made the basis to determine an underexposure in consideration of film speed, while the voltage $V_4$ is applied to the inverting input terminals of the comparators $OP_4$ and $OP_5$ as reference voltages which are made the basis to determine an emission terminate level and an overexposure, respectively, as the film speed is considered. At the initiation of running of the first blind, both $V_1$ and $V_2$ are less than $V_3$ and $V_4$, as indicated in FIG. 3, whereby the comparators $OP_3$, $OP_4$ and $OP_5$ produce outputs of "H", "L" and "L" level, respectively.

When the first blind has completed running and the shutter becomes fully open, the X-contacts switch $SW_2$ is closed. See FIGS. 3 and 4(a). Thereupon, the automatic electronic flash is activated to emit flashlight, through a signal path, not shown, and the flashlight is reflected by an object being photographed to impinge upon the camera. Accordingly, the voltage $V_1$ which represents an integral of the amount of incident light as well as the voltage $V_2$ which represents a division of the voltage $V_1$ both increase rapidly, as indicated in FIG. 3.

Subsequently at a given time interval to determine an overexposure after the closure of the contacts $SW_2$, the overexposure examine pulse signal $S_2$ is produced by the timing pulse controller $TPC_1$. If the voltage $V_2$ exceeds the reference voltage $V_4$ at the time the signal $S_2$ is produced, this implies the existence of an overexposure if a given film latitude is taken into consideration as compared with the decision level at which the emission terminate signal $S_5$ is produced, as indicated in FIG. 3. Accordingly, the overexposure is displayed. Specifically, at time when the output of the comparator $OP_5$ changes to its "H" level for $V_2 > V_4$, and when the signal $S_2$ momentarily changes to its "H" level, the output of NAND circuit $ND_2$ momentarily assumes its "L" level, whereby the R-S flipflop formed by NAND circuits $ND_5$ and $ND_6$ is set, producing an "H" level output from NAND circuit $ND_5$. This causes the inverter $IN_3$ to produce an output of "L" level, whereby the light emitting diode $LD_2$ is energized to display the overexposure to a photographer. If, on the contrary, the voltage $V_2$ does not exceed the reference voltage $V_4$ at the time the signal $S_2$ is produced, no display of the overexposure is made. Specifically, the output of the comparator $OP_5$ remains at its "L" level, so that a momentary change of the signal $S_2$ to its "H" level cannot change the output of NAND circuit $ND_2$ from its "H" level, thus failing to set the R-S flipflop to energize the diode $LD_2$.

Subsequently, when a time interval corresponding to a full emission from the electronic flash has passed since the closure of the contacts $SW_2$, the timing pulse controller $TPC_1$ produces the underexposure examine pulse signal $S_1$, as indicated in FIG. 4(c). If the voltage $V_1$ does not reach the level of the reference voltage $V_3$ at the time the signal $S_1$ is produced, this represents an underexposure if a given film latitude is taken into consideration as compared with the decision level where the emission terminate signal $S_5$ is produced, as shown in FIG. 3. Accordingly, the underexposure is displayed. Specifically, when the signal $S_1$ momentarily changes to its "H" level while the output of the comparator $OP_3$ remains at its "H" level, the output of NAND circuit $ND_1$ momentarily changes to its "L" level, thus setting the R-S flipflop formed by NAND circuits $ND_3$ and $ND_4$. Consequently, the output of NAND circuit $ND_3$ assumes its "H" level while the output of the inverter $IN_2$ assumes its "L" level, energizing the light emitting diode $LD_1$ to display the underexposure to a photographer. If, on the contrary, the voltage $V_1$ exceeds the reference voltage $V_3$ at the time the signal $S_1$ is produced, no display of the underexposure is made. Specifically, if the signal $S_1$ momentarily changes to its "H" level when the output of the comparator $OP_3$ reverts to its "L" level, the output of NAND circuit $ND_1$ does not change from its "H" level, whereby the R-S flipflop formed by NAND circuits $ND_3$ and $ND_4$ cannot be set to energize the diode $LD_1$.

Immediately after the underexposure examine pulse signal $S_1$ is produced, the proper exposure display pulse signal $S_3$ is produced by the timing pulse controller $TPC_1$, as shown in FIG. 4(d). It is to be noted that at the time when the signal $S_3$ is produced, the examination of both the overexposure and the underexposure has already been completed, and the R-S flipflop formed by NAND circuits $ND_3$ and $ND_4$ and the R-S flipflop formed by NAND circuits $ND_5$ and $ND_6$ are in either their set or reset condition. Assuming that the examination of the overexposure and the underexposure failed to detect either condition, both flipflops are reset, feeding two inputs of "H" level to the three input NAND circuit $ND_7$. When the third input to the circuit $ND_7$ momentarily changes to its "H" level in response to the application of the signal $S_3$ while other two inputs assume the "H" level, the output of NAND circuit $ND_7$ momentarily changes to its "L" level, thus setting the R-S flipflop formed by NAND circuits $ND_8$ and $ND_9$. Thus the output of NAND circuit $ND_9$ assumes its "H" level and hence the output of the inverter $IN_4$ assumes its "L" level to energize the light emitting diode $LD_3$ to display the proper exposure to a photographer. On the other hand, if the overexposure or the underexposure has already been detected when the signal $S_3$ is produced, either R-S flipflop formed by NAND circuits $ND_3$ and $ND_4$ or $ND_5$ and $ND_6$ would be set, whereby one of the first and the second input to NAND circuit $ND_7$ assumes its "L" level. Hence, the application of the signal $S_3$ to change the third input to its "H" level momentarily does not result in changing the output of NAND circuit $ND_7$ to "L" level. Thus, the R-S flipflop formed by NAND circuits $ND_8$ and $ND_9$ cannot be set to energize the diode $LD_3$.

Thus it will be seen that by the time the proper exposure display pulse signal $S_3$ is produced, a determination is given indicating whether the photographing operation performed with the aid of the electronic flash has resulted in an overexposure, an underexposure or a proper exposure, by selectively energizing either one of the diodes $LD_1$, $LD_2$ or $LD_3$. At a given time interval for display after the closure of the X-contacts $SW_2$, the timing pulse controller $TPC_1$ produces the reset pulse signal $S_4$, as indicated in FIG. 4(e), which signal is applied to the other input of NAND circuit $ND_4$, the other input of NAND circuit $ND_6$ and one input of NAND circuit $ND_8$, thus resetting all of the R-S flipflops. Hence, the output of NAND circuits $ND_3$, $ND_5$ and $ND_9$ assume "L" level, deenergizing the light emitting diode $LD_1$, $LD_2$ or $LD_3$ which has previously been energized to terminate the indication of proper or improper exposure provided by the electronic flash.

In the described embodiment, the indicator for proper or improper exposure has been assumed to be disposed within the camera, but it should be understood that it may alternatively be disposed within the automatic electronic flash.

What is claimed is:
1. An indicator for proper or improper exposure provided by automatic electronic flash, comprising:
    means including a first comparison means for producing an emission terminate signal when an amount of exposure provided by light reflected from an object being photographed has reached a proper exposure level which is adjusted to correspond to a preset film speed;
    a first decision circuit including a second comparison means and having a first decision level which is lower than the decision level corresponding to the proper exposure level;
    a second decision circuit including a third comparison means and having a second decision level higher than the decision level corresponding to the proper exposure level said proper decision level being intermediate said first and second decision levels so that the difference between the first decision level and the proper decision level is greater than 0.1 Ev;
    means for displaying an overexposure in response to an output from the second decision circuit at a given time interval after the initiation of emission of flashlight from an automatic electronic flash;
    means for displaying an underexposure in response to an output from the first decision circuit at a time interval after the initiation of emission flashlight from the automatic electronic flash, the time interval corresponding to the time required for full emission of flashlight from the electronic flash;
    and means for displaying a proper exposure in response to outputs from the first and the second decision circuits.

2. An indicator according to claim 1 in which said means for producing the emission terminate signal comprises a comparator having a non-inverting input terminal to which an integral voltage representative of the amount of exposure is applied and an inverting input terminal to which a voltage representing the decision level corresponding to the proper exposure level is applied.

3. An indicator according to claim 1 in which the first decision circuit comprises a comparator having an inverting input terminal to which an integral voltage representative of the amount of exposure is applied and a non-inverting input terminal to which a voltage corresponding to the first decision level is applied.

4. An indicator according to claim 1 in which the second decision circuit comprises a comparator having a non-inverting input terminal to which a division of an integral voltage representative of the amount of exposure is applied and an inverting input terminal to which a voltage corresponding to the decision level which corresponds to the proper exposure level is applied.

5. An indicator according to claim 1 in which the first and the second decision circuits are coupled to gates which are enabled by signals produced by a timing pulse controller to operate the over exposure, under exposure, and proper exposure display means.

6. An indicator according to claim 1 in which each of said display means is comprised of a light-emitting diode.

7. An indicator according to claim 1 in which said over exposure, under exposure and proper exposure display means are enabled by signals produced by a timing pulse controller.

8. An indicator according to claim 7 in which said timing pulse controller develops signals for sequentially enabling said over exposure, under exposure and proper exposure display means in a pre-determined sequence.

9. An indicator according to claim 1 further comprising a timing pulse controller for generating a plurality of enabling signals;
first gating means responsive to a signal from said first decision circuit and one of said timing pulses for operating said under exposure display means;
second gating means responsive to a second one of said timing signals and a signal from said second decision circuit for enabling said over exposure display means; and
third gating means responsive to the absence of over exposure and under exposure signal conditions from said second and first decision circuits and responsive to a third one of said timing pulses for enabling said proper exposure display means.

10. An indicator according to claim 9, further comprising flip-flop circuits each coupled between one of said gating means and an associated display means for temporarily storing the detected condition.

11. An indicator according to claim 10 in which said timing pulse controller further provides a reset pulse for simultaneously resetting all of said flip-flops, a predetermined time after all of said display means have been enabled.

12. The indicator of claim 1 wherein the difference between said first decision level and said proper exposure level and the difference between said second decision level and said proper exposure level is in the range of from $\frac{1}{3}$ Ev to $\frac{1}{2}$ Ev.

13. An indicator according to claim 1 in which the proper exposure display means generates a proper exposure display independently of the emission terminate signal.

* * * * *